(12) United States Patent
Wang et al.

(10) Patent No.: US 11,491,682 B2
(45) Date of Patent: *Nov. 8, 2022

(54) ROUTER BIT WITH A FLARED CUTTING EDGE

(71) Applicants: Henry Wang, Winter Park, FL (US); Ralph Bagnall, Fort Myers, FL (US)

(72) Inventors: Henry Wang, Winter Park, FL (US); Ralph Bagnall, Fort Myers, FL (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/183,749

(22) Filed: Feb. 24, 2021

(65) Prior Publication Data

US 2021/0178629 A1 Jun. 17, 2021

Related U.S. Application Data

(63) Continuation-in-part of application No. 15/958,054, filed on Apr. 20, 2018, now Pat. No. 10,940,606.

(51) Int. Cl.
*B27G 13/14* (2006.01)
*B23C 3/12* (2006.01)
*B27F 1/02* (2006.01)

(52) U.S. Cl.
CPC .............. *B27G 13/14* (2013.01); *B23C 3/126* (2013.01); *B27F 1/02* (2013.01)

(58) Field of Classification Search
CPC ....... B23C 2210/242; B23C 5/12; B23C 5/10; B27F 1/00; B27F 1/02; B27F 1/04; B27F 1/08; B27F 1/10; B27F 1/14; B23P 15/34; B23P 15/38; Y10T 407/1948; Y10T 407/1946; B27G 13/002; B27G 13/12; B27G 13/14
See application file for complete search history.

(56) References Cited

U.S. PATENT DOCUMENTS

| 1,348,302 | A | 8/1920 | Muller |
| 3,888,161 | A | 6/1975 | Baudermann |
| 5,199,477 | A | 4/1993 | Keller |
| 5,647,700 | A | 7/1997 | Velepec |
| 7,452,169 | B2 | 11/2008 | Tart et al. |
| 7,810,532 | B2 | 10/2010 | Bird |
| 7,862,263 | B2 | 1/2011 | van Iperen |
| 8,181,680 | B1 | 5/2012 | Clark |

(Continued)

OTHER PUBLICATIONS

Bagnall, Ralph, "The Magic of Custom Tooling", PowerPoint presentation, 2016, 40 pages.

*Primary Examiner* — Matthew Katcoff
(74) *Attorney, Agent, or Firm* — Wolter Van Dyke Davis, PLLC; Robert L. Wolter

(57) ABSTRACT

A bearingless groove router bit includes at least one cutting element affixed to a head of the router bit and has a first end spaced from an end of connected shank connected to the head and a second end adjacent to the second end of the head. The cutting element includes a cutting edge extending along the cutting element between the first to the second end of the cutting element. The cutting edge may include a radial side edge that projects radially inwardly relative to a central axis of the router bit and a straight side edge that extends from an end of the radial side edge outwardly relative to the central axis to minimize tear out during cutting of a groove in a work piece.

14 Claims, 13 Drawing Sheets

(56) References Cited

U.S. PATENT DOCUMENTS

| | | | |
|---|---|---|---|
| 8,375,556 B2* | 2/2013 | Nakano | A63B 53/047 |
| | | | 473/331 |
| 8,529,164 B2* | 9/2013 | Degany | B23C 5/109 |
| | | | 407/53 |
| 2003/0021642 A1* | 1/2003 | Bankston | B27G 13/10 |
| | | | 407/42 |
| 2014/0341661 A1 | 11/2014 | Lin | |
| 2015/0299051 A1 | 10/2015 | Kinoshita | |
| 2017/0203465 A1* | 7/2017 | Crabtree, II | B23C 3/28 |
| 2018/0079016 A1 | 3/2018 | Azegami | |
| 2021/0129274 A1* | 5/2021 | Geist | B23C 5/10 |

\* cited by examiner

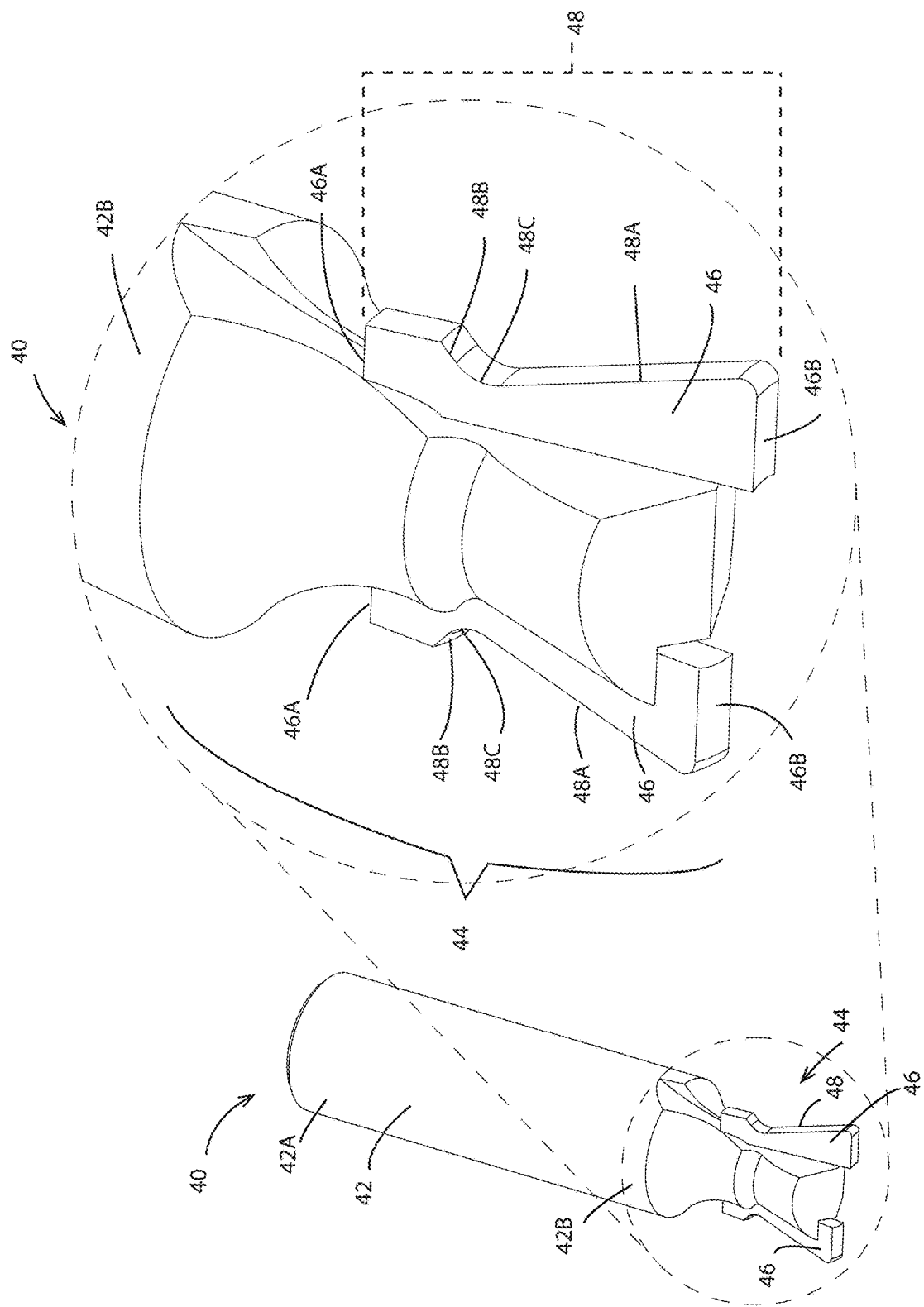

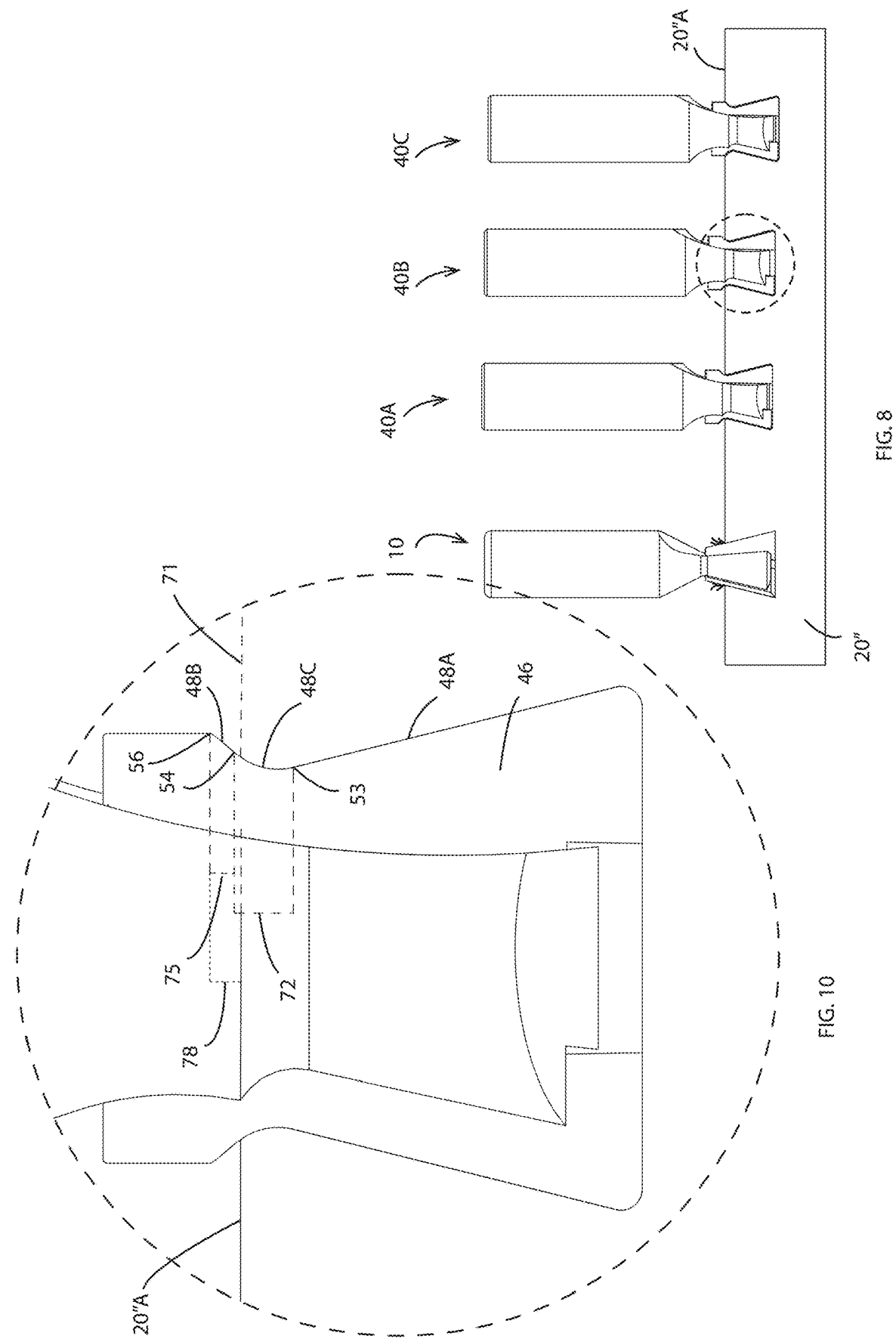

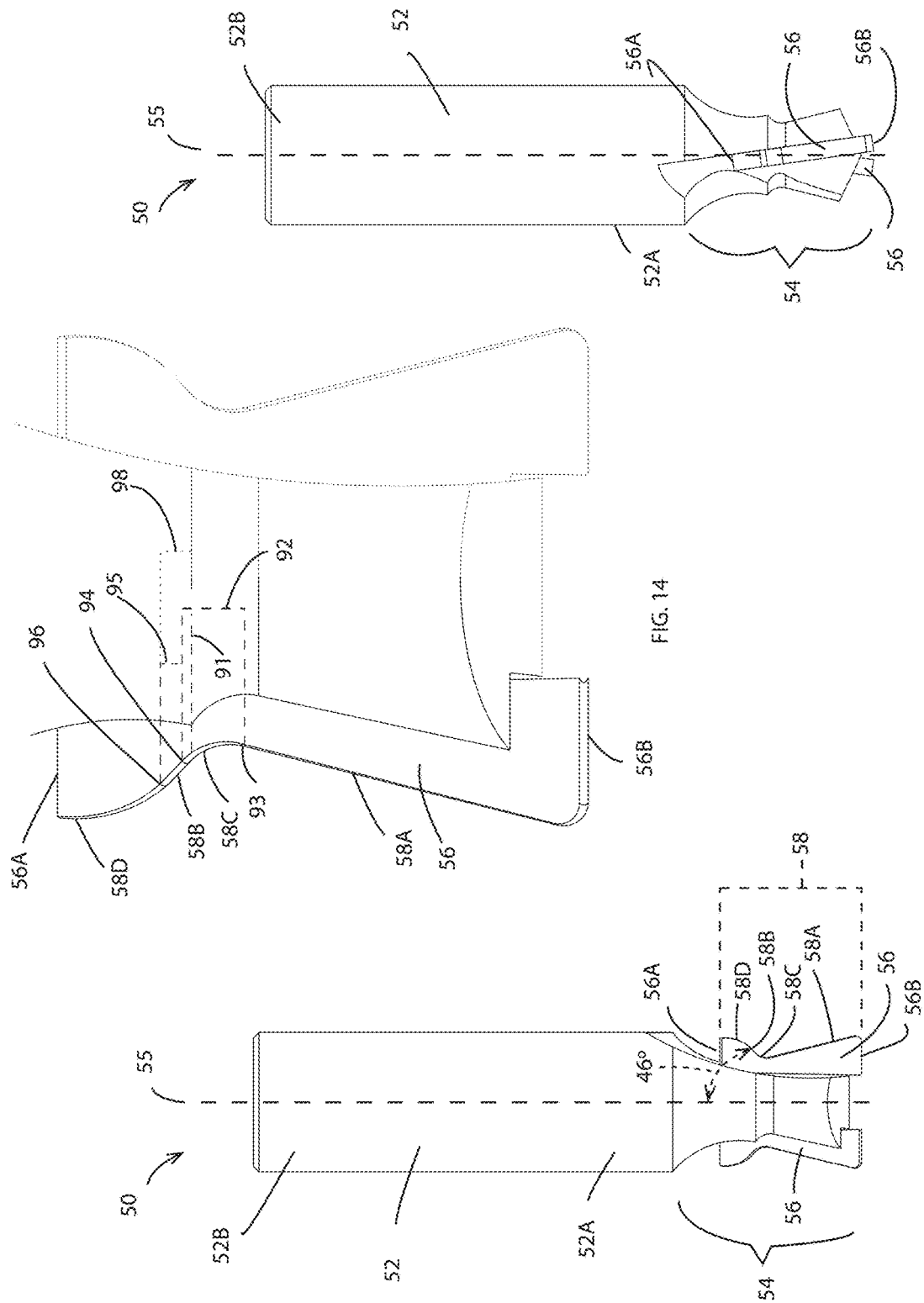

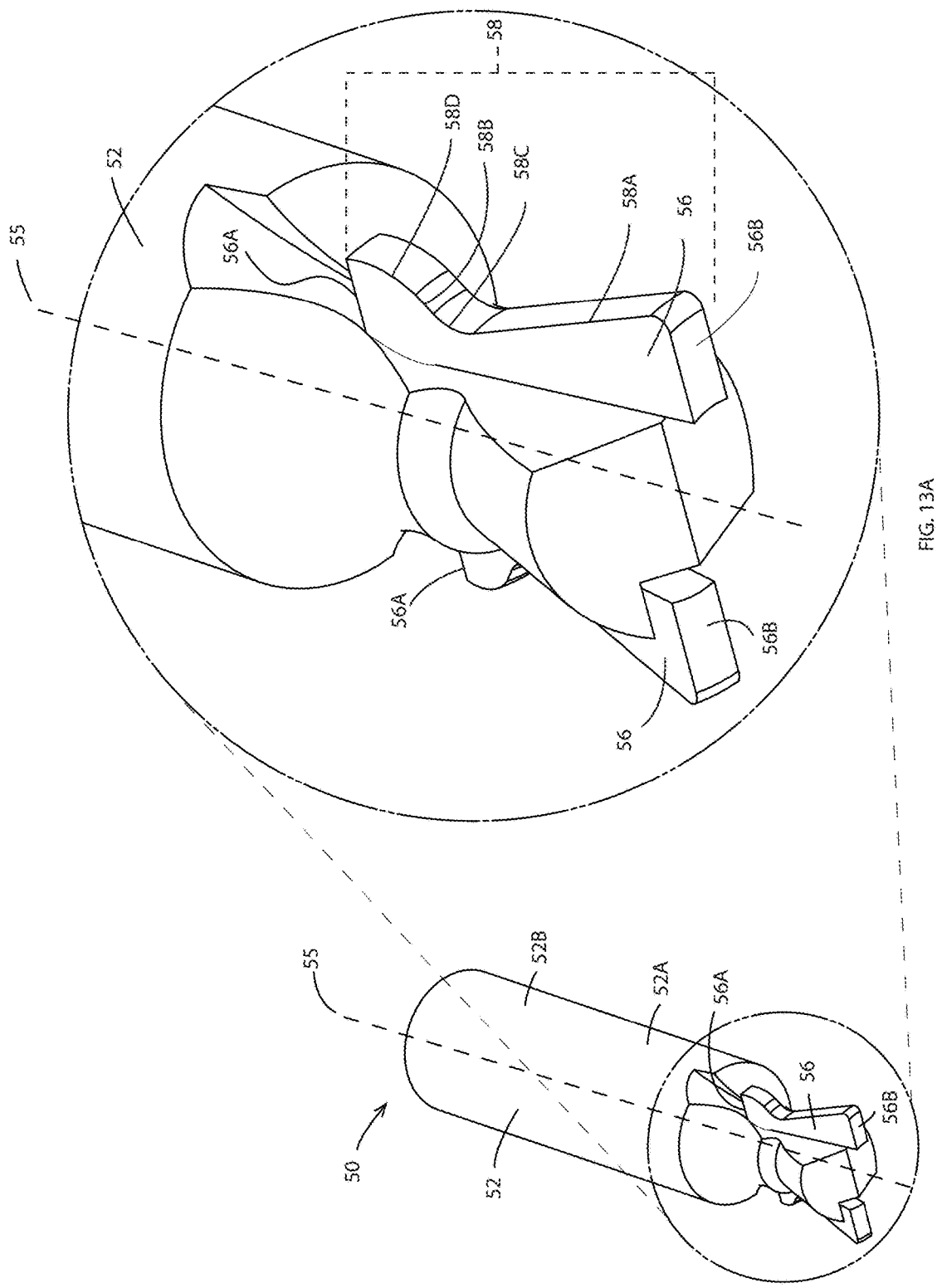

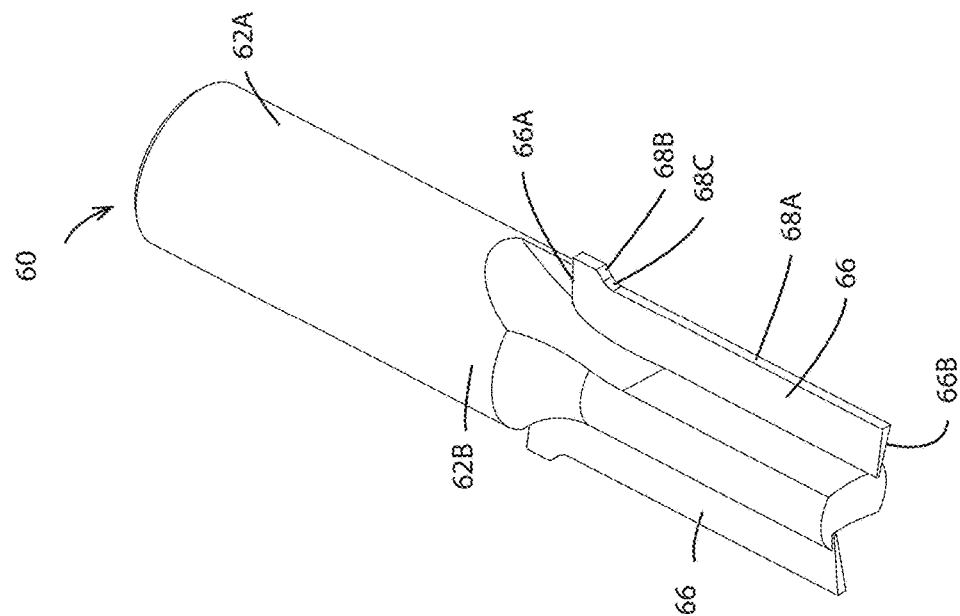
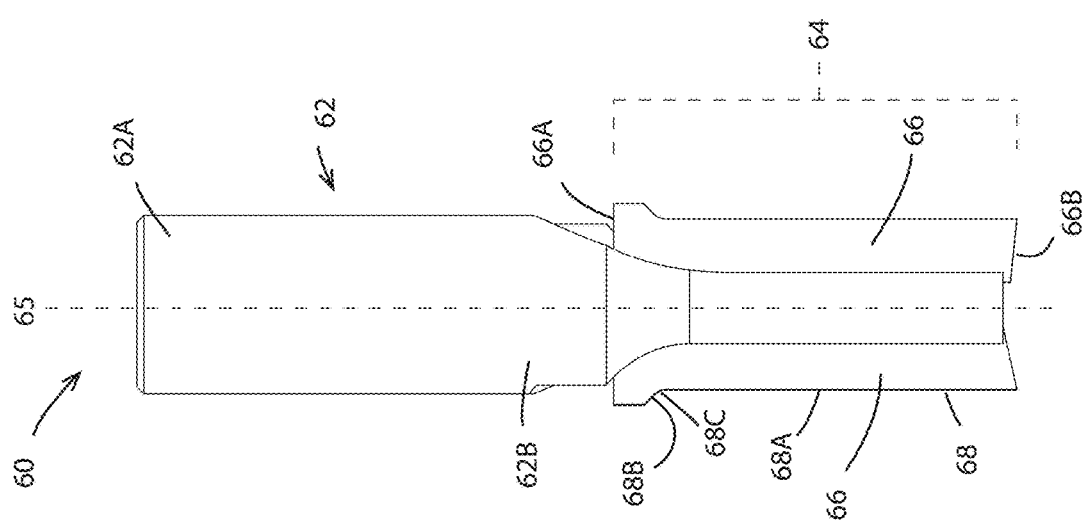

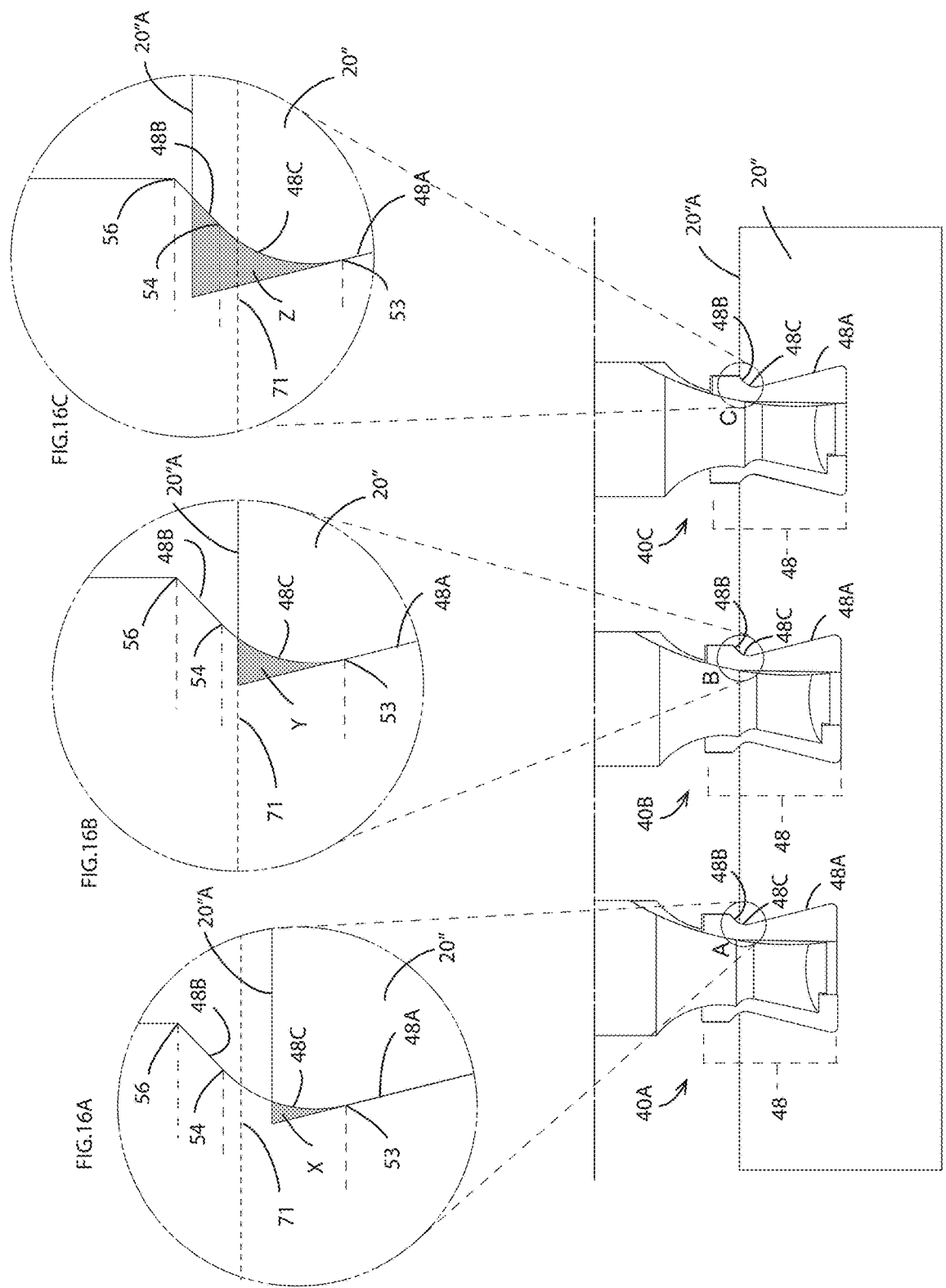

ROUTER BIT WITH A FLARED CUTTING EDGE

FIELD OF THE INVENTION

Aspects of the invention pertain to router bits that are used to cut channels or grooves in or through in interior portion of a work piece spaced inward relative to an edge of the work piece. More specifically, aspects of the invention relate to bearingless router bits that are used for cutting channels or grooves in work pieces.

BACKGROUND OF THE INVENTION

In woodworking, cutting a groove with a router bit secured on a router is a very common practice. Such a cutting operation may be performed in one of two scenarios. In one case, a hand-held router and the groove router bit are advanced across or against a wooden work piece that is secured on a work table. Alternatively, a router device and router bit may be mounted to a table, and a work piece is advanced against or across the rotating router bit. The depth of groove cut is controlled primarily the contacting interface of the surfaces of the router base and the work piece, which define an area of a few square inches around the cutting elements of the router bit. It is common that natural wood surfaces, or manmade wood boards, are uneven across an entire length or width or both of the work piece. Therefore, in addition to an inaccurate router equipment setup, the non-uniform dimensions of a work piece that advance cutting elements of the router bit often cause the depth of a cut vary across the work piece. This is true even with computer numerical control (CNC) router devices, the movement of which is more accurate than manually operated router devices, the uneven wood board surfaces still will cause the change of depth of cut.

A prior art router bit 10 is shown in FIG. 1 including a router head or body 14 on an end of a shank 12. The router head 14 includes two diametrically opposed cutting elements 16 each having a cutting edge 18 for cutting a work piece 20. The router bit 10 shown in FIGS. 1-3 has a dovetail-shaped profile to cut a correspondingly shaped groove 22 in the work piece 20.

The cutting elements 16 are typically composed of a metal alloy such as tungsten carbide, and the head 14 may be composed of a high speed steel alloy. Each cutting element 16 includes a side cutting edge 18 that defines a cutting length or cutting depth of the router bit 10. For example, a commonly used dovetail router bit includes a ½" cutting depth measured from a bottom terminus 18A to a top terminus 18B of the cutting edge 18.

When the work piece 20 is cut, the termini 18B are generally disposed at or above a top surface 20A (FIGS. 2 and 3) of the work piece 20 to remove material to form the opening 22A. Often times when cutting a work piece the direction of a cut is against a wood grain orientation or the wood grain direction. In such cases, the cut may go deeper than intended creating wood shavings or pieces, referred to as "tear out" 23, as shown in FIG. 3. Wood "tear out" includes wood shavings that are levered upward by the cutting edge 18.

With respect to FIG. 3, the work piece 20 includes wood grain 25 that has a wood grain orientation or direction represented by arrows A, B. The cutting direction of the prior art router bit 10 is generally orthogonal to the wood grain direction or "against the grain" causing the tear out 23 as shown.

Additional factors that may play into the formation of "tear out" may include the work piece 20 having a non-uniform thickness and/or the bit 10 is not properly positioned in a router device relative to the work piece 20. For example, a thickness dimension of a work piece may not be uniform and may vary across a length or width of the work piece. Accordingly, when cutting a groove in the work piece 20, the terminus 18B of the cutting edge 18 may contact the work piece 20 below an outside surface of the work piece 20 thereby causing tear out similar to that shown in FIGS. 2 and 3.

With respect to FIG. 4, a round-over bit 30 is shown relative to a work piece 20'. A round-over bit 30 includes a generally 90° radial cutting edge 38 extending from a lower terminus 38A to an upper terminus 38B, with terminus 38B as the intended cutting height to be leveled to surface 20'A As illustrated, if the work piece 20' has a non-uniform thickness or the bit 30 is not properly aligned, the upper terminus 38B may cut below a surface 20'A of the work piece 20' forming a step 36, which is undesirable. Round-over bits 30 are often used to cut a rounded profile along an edge of a work-piece, and may include a bearing at an end to control movement of the bit 30 along the edge of the work piece. However, if the height of the bit 30 relative to the work piece is not properly adjusted, or the work piece has a non-uniform thickness, as step may be formed on the workpiece surface.

SUMMARY OF THE INVENTION

The inventors of embodiments of the invention disclosed herein have developed a bearingless groove router bit that reduces or eliminates "tear-out" along a groove edge that may be caused by cutting against a wood grain, improper alignment of a router bit relative to a work piece and/or a work piece having a non-uniform thickness dimension. To that end, the inventors have developed a bit profile that includes at least one inwardly projecting radial cutting edge that provides a cutting tolerance to account for a cut direction against a wood grain, misalignment of the bit and/or non-uniform thickness of a work piece. The radial cutting edge preferably has a curvature of radius of about 1.0 mm to about 2.5 mm, and preferably 1.5 mm, to provide a radial cut along an open edge of a groove, thereby reducing or eliminating "tear-out" caused by prior art router bits and bit profiles.

Aspects of the invention pertain to a bearingless router bit for cutting a groove in an interior of a workpiece beginning from a side edge of the workpiece. The router bit may comprise a shank connectable to a router chuck, also referred to as a router collet; and a head having a first end connected to an end of the shank and a second free end distal and opposite the first end. The bit has a central longitudinal axis, or the shank and head have a common central longitudinal axis about which the bit rotates for cutting. The bit has at least one cutting element affixed to the head and has a first end spaced from the end of shank connected to the head and a second end adjacent to the second end of the head.

In an embodiment a cutting edge extends along the cutting element from the first end to the second end of the cutting element. The cutting edge preferably comprises a first straight side edge extending from the first end of the cutting element toward the second end of the cutting element; a second straight side edge that extends radially upward and outward relative to the first side edge of the cutting element and central axis; and, a radial side edge between and integral with the first side edge and second side edge and the radial side edge has a radius of curvature from about 1.0 mm to about 2.5 mm, and preferably about 1.5 mm. The radial side edge defines a tangent arc relative to the first side edge and the second side edge, and the radial side edge defines an inwardly projecting arc relative to the central axis.

In an embodiment, the second side edge of the cutting edge is disposed at an angle from about 35° to about 55°, or from about 145° to about 125° relative to the central axis of the bit. In a preferred embodiment, the second side edge is disposed at an angle of about 46°, or about 134°, relative to the central axis.

According to other aspects of the invention, the router bit comprises two diametrically opposed cutting elements affixed to the head and each cutting element has a first end spaced from the end of shank connected to the head and a second end adjacent to the second end of the head. In addition, each cutting element has a cutting edge extending along a respective side of the cutting element from the first end to the second end of the cutting element.

Each cutting edge comprises a first straight side edge extending from the first end of the cutting element toward the second end of the cutting element and a second straight side edge extending radially upward and outward relative to the first side edge of the cutting edge and a central axis of the router bit. Each cutting edge also comprises a radial side edge between and integral with the first side edge and second side edge and the radial side edge has a radius of curvature from about 1.0 mm to about 2.5 mm, and preferably about 1.5 mm. In addition, each radial side edge defines a tangent arc relative to the first side edge and the second side edge, and the radial edge defines an inwardly projecting arc relative to the central axis.

In an embodiment of the invention for a bearingless groove bit, each cutting edge may comprise a second radial side edge spaced above the first radial side edge and integral with the second straight edge opposite the first radial side edge, and the second radial side edge defines an outwardly projecting arc relative to the central axis.

DESCRIPTION OF THE DRAWINGS

These and other advantages of the invention will become more apparent from the following description in view of the drawings. Similar structures illustrated in more than one figure are numbered consistently among the drawings.

FIGS. 4A-4B are detailed views of steps formed in a work piece by a prior art rounder-over router bit.

FIGS. 4C-4D are detailed view of a prior art rounder-over router bit engaging a work piece for cutting.

FIG. 7 is a perspective view of the router bit of FIGS. 5 and 6.

FIG. 7A is a perspective view of the router bit head of the router bit of FIG. 7.

FIG. 8 is an elevational view of a workpiece and a prior art router bit engaging the workpiece and the router bit, according to aspects of the invention, engaging the workpiece for cutting grooves in the work piece at different depths.

FIG. 10 is an elevational view of the cutting element and cutting edge of router bit according to aspects of the invention.

FIG. 11 is a front or back elevational view of a second embodiment of the router bit in accordance with aspects of the invention.

FIG. 12 is a side elevational view of the router bit of FIG. 11.

FIG. 13 is a perspective view of the second embodiment of the router bit according to aspects of the invention.

FIG. 13A is a perspective view of the head of the router bit of FIG. 13.

FIG. 14 is an elevational view of a cutting element and a cutting edge of the second embodiment of the invention.

FIG. 15 is a front or back elevational view of a router bit according to aspects of the invention.

FIG. 15A is a perspective view of the router bit of FIG. 15.

FIG. 16 is an elevational view of the work piece of FIG. 9 with router bits 40A, 40B, 40C.

FIGS. 16A, 16B, and 16C are expanded views of an interface between the respective router bits 40A, 40B, 40C.

DETAILED DESCRIPTION OF THE INVENTION

Figure 1:
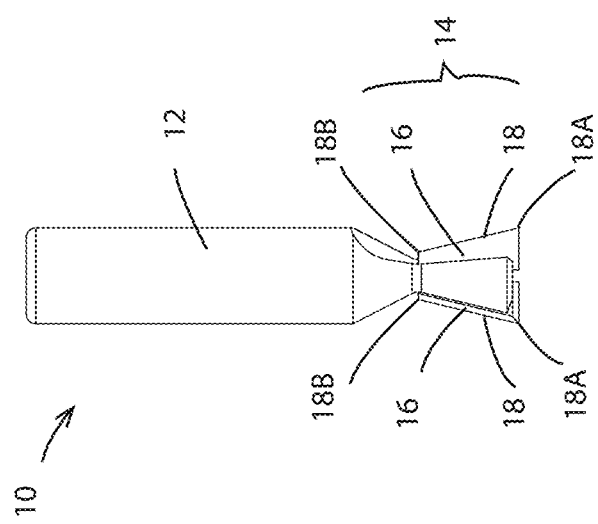
FIG. 1 is an elevational view of a prior art dovetail router bit.
Figure 2:
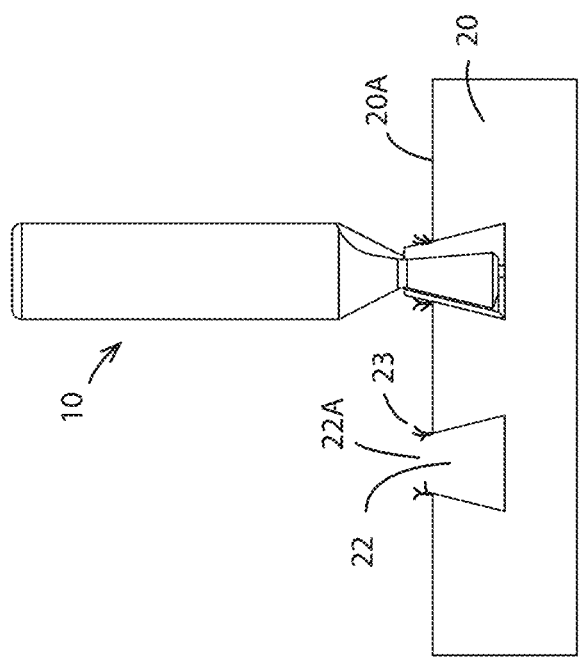
FIG. 2 is an elevational view of the prior art router bit of FIG. 1 engaging a work piece.
Figure 3:
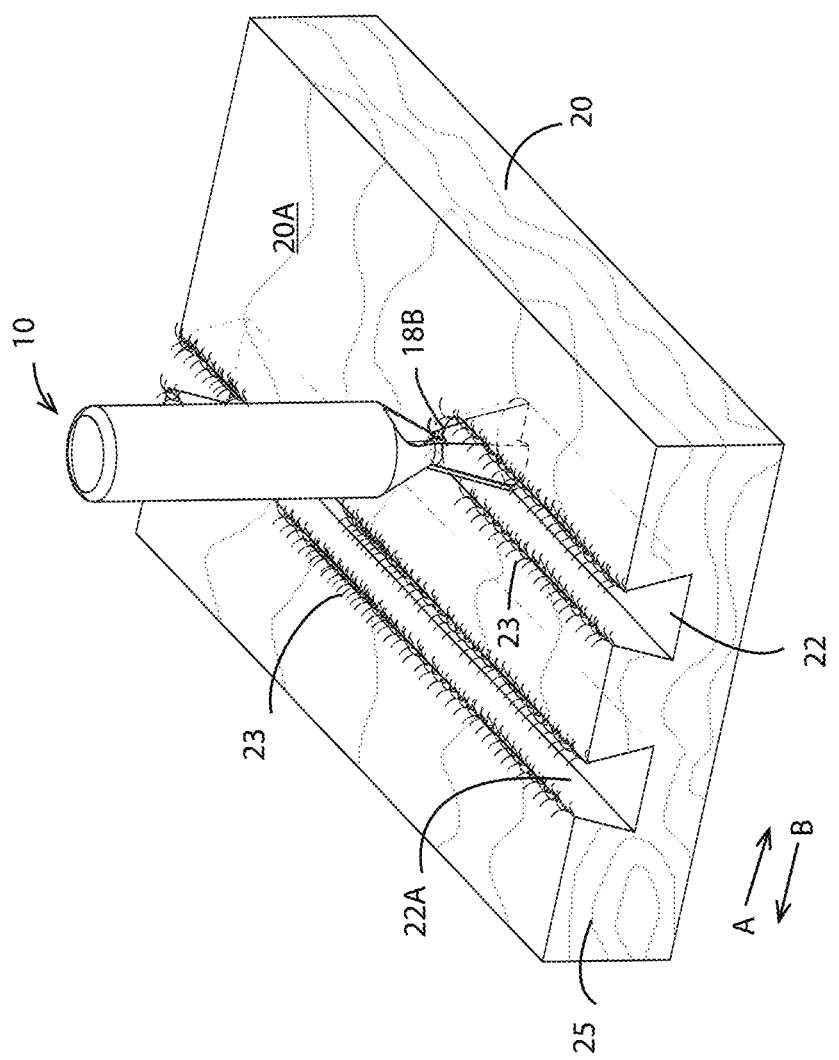
FIG. 3 is a perspective view of a work piece having been cut with a prior art router bit showing tear-out of the workpiece.
Figure 4:
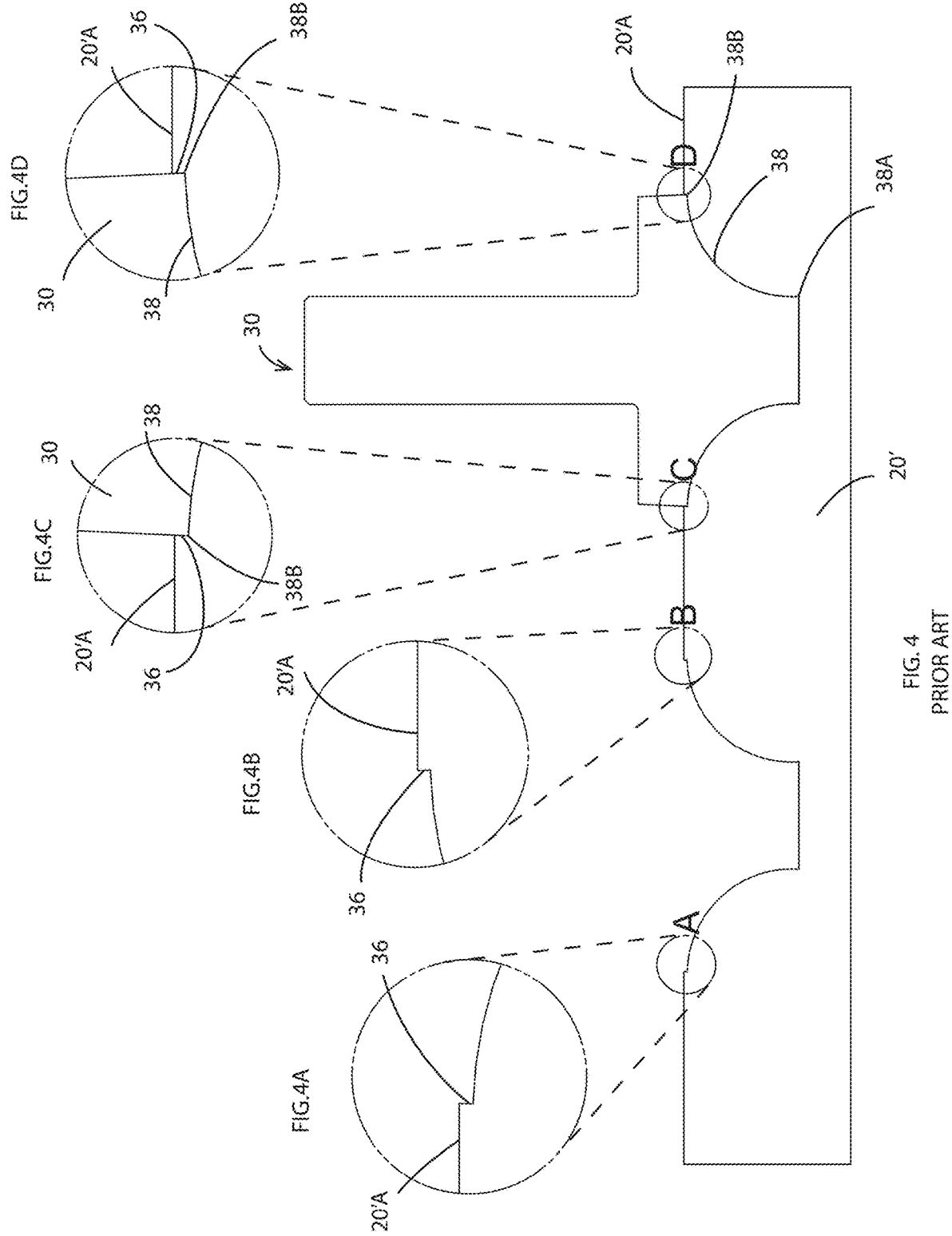
FIG. 4 is an elevational view of a prior art round-over router bit engaging a work piece.
Figure 6:
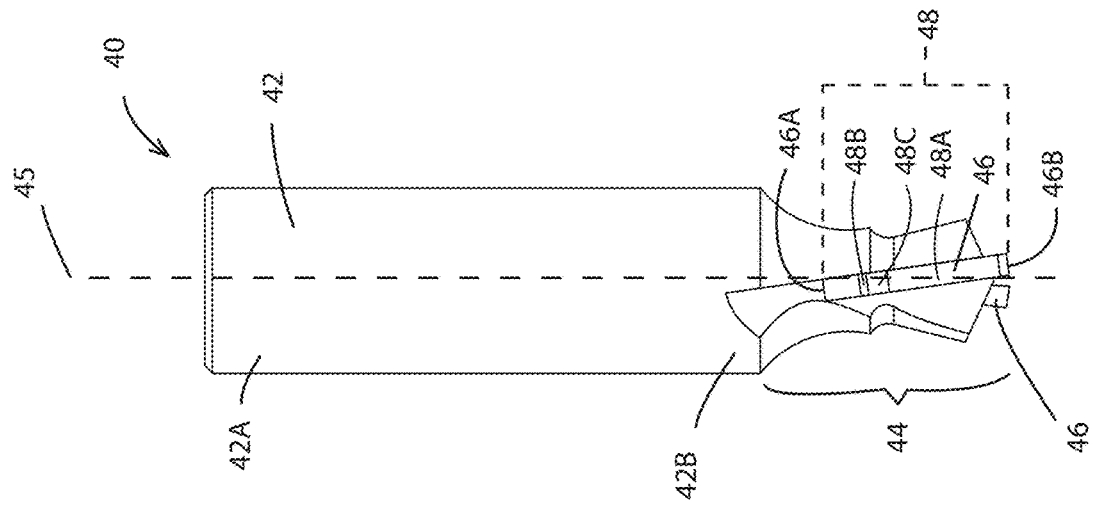
FIG. 6 is a side elevational view of a router bit in accordance with aspects of the invention.
Figure 5:
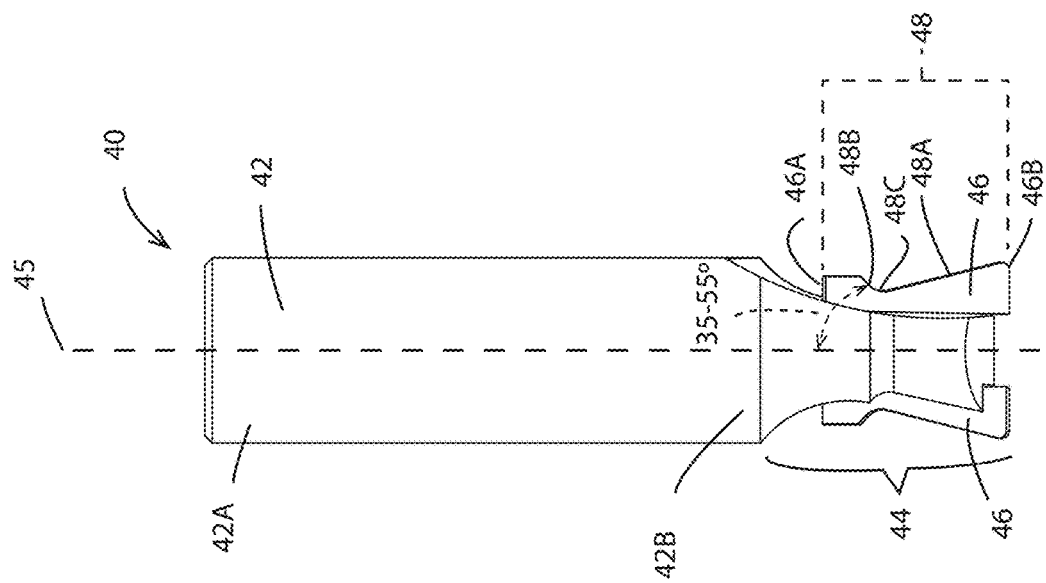
FIG. 5 is a front or back elevational view of a router bit in accordance with aspects of the invention.

In describing particular features of different embodiments of the present invention, number references will be utilized in relation to the figures accompanying the specification. Similar or identical number references in different figures may be utilized to indicate similar or identical components among different embodiments of the present invention.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. It is to be noted that all ranges disclosed within this specification are inclusive and are independently combinable.

The terms "top" and "bottom" or "upper" and "lower" may be used interchangeably herein depending on the orientation of the router bit. That is, depending on the type of router device, hand-held or table mounted, for example, the head of a router bit may be facing downward or upward relative to the router device or a work piece.

Aspects of the invention are illustrated in the router bit 20 of FIGS. 5-7, and 7A. As shown the router bit 40 may comprise a shank 42 and a head 44 at an end of the shank 42. The shank 42 is configured to fit within a router chuck or collet of a router device (not shown) for cutting a work piece. More specifically, the shank 42 includes a first end 42A that fits into a chuck which is tightened against the shank 42 to support the router bit 40 within the router device. The head 44 is disposed at a second end 42B of the shank 42 spaced from the chuck and router device for cutting. In addition, the bit 40 includes a central longitudinal axis 45 which is common to the shank 42 and head 44, and about which the router bit 40 rotates for cutting.

One or more cutting elements 46 are affixed to the head 44. According to an aspect of the invention the router bit 40 comprises two diametrically opposed cutting elements 46, affixed to opposite sides of the head 44. Each cutting element 46 includes a first end 46A spaced from the second end 42B of the shank 42, and a second end 46B distal the first end 46A.

Each cutting element 46 includes a cutting edge 48 that extends between the first end 46A to the second end 46B of the cutting element 46. According to aspects of the invention, the cutting edge 48 includes a straight first side edge 48A extending from the second end 46B of the cutting element 46 toward the first end 46A of the cutting element 46. In addition, a straight second side edge 48B is spaced from the first side edge 48A and projects or extends upwardly (or downwardly) and outwardly relative to the central axis 45. In an embodiment, the second side edge 48B is disposed at an angle of about 35° to about 55°, or about 145° to about 125°, relative to the central axis 45, and preferably about 40° to about 50°, or about 140° to 130°, and most preferably about 46°, or 134°, relative to the central axis 45.

With respect to certain embodiments of the invention, the cutting edge 48 further comprises a radial side edge 48C between and integral with the first side edge 48A and the second side edge 48B. As shown the radial side edge 48C projects radially inwardly relative to the central axis 45, and preferably has a radius of curvature of from about 1.0 mm (0.040 inches) to about 2.5 mm (0.100 inches), and preferably a radius of curvature of 1.5 mm (0.06 inches).

Figure 9:
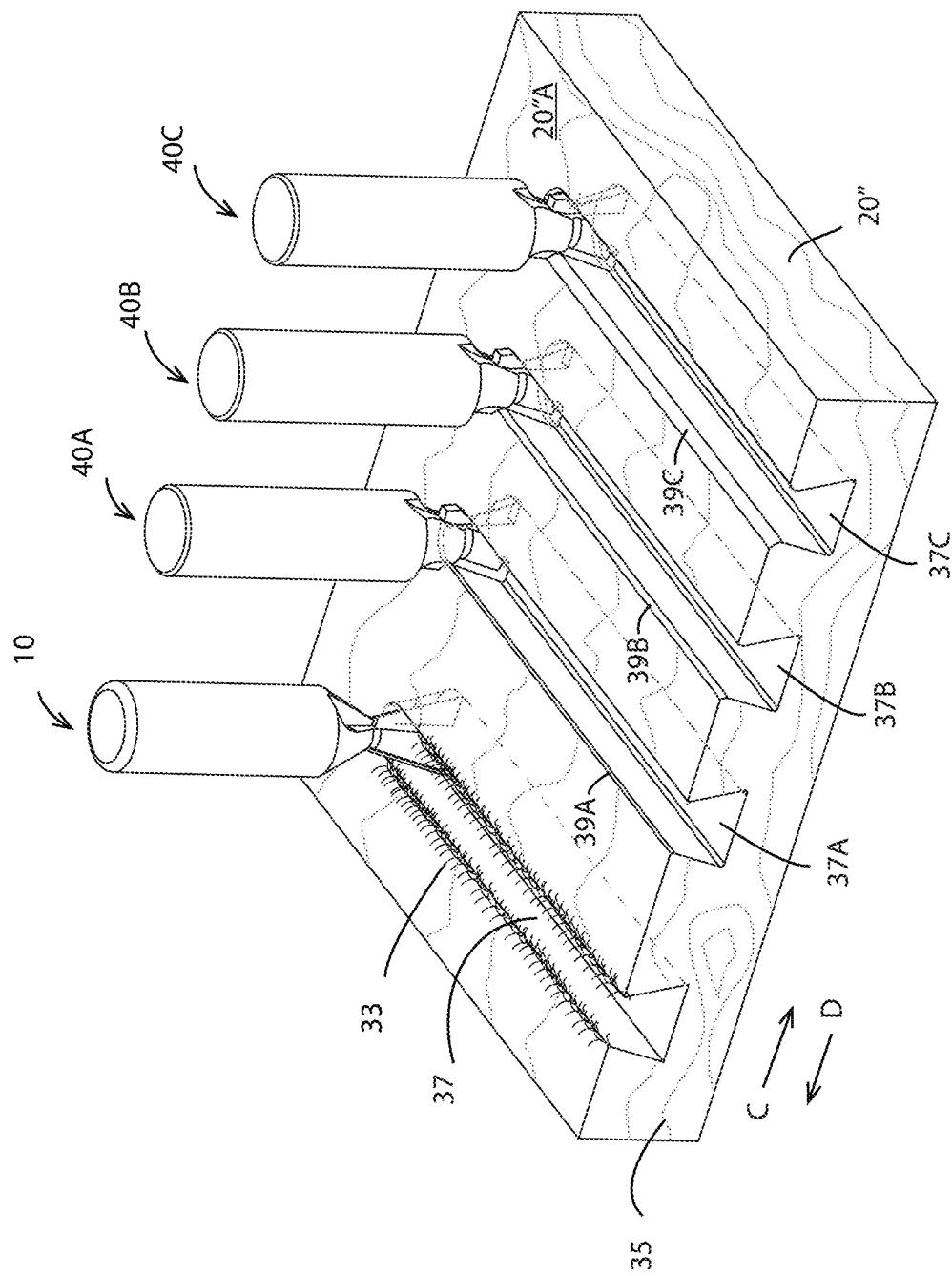
FIG. 9 is a perspective view of the workpiece and router bits of FIG. 8.

With respect to FIGS. 8 and 9, a work piece 20' is shown being cut by a prior art router bit 10 and routers bits 40A, 40B, 40C according to aspects of invention. As shown in FIG. 9, work piece 20' includes a wood grain 35 having orientations or directions according to arrows C, D. To that end, the cuts 37, 37A-37C made by the bits 10, 40A-40C are against the grain, and at least with respect to the prior art bit 10; tear out 33 is created along the opening of the cut 37.

The grooves 37A, 37B, 37C, having been respectively cut by the inventive router bits 40A, 40B, 40C, do not include tear out as the radial side edge 48C of cutting edge 48 suppresses, removes, inhibits or eliminates tear out that may be generated during cutting. As shown in FIG. 9, the radial side edge 48C forms the radial surfaces 39A, 39B, and 39C at the openings of the grooves 37A, 37B, and 37C.

As will be explained in more detail, the cutting edge 48 and radial side edge 48C are configured such that a surface 20A of the work piece 20' may be aligned, within tolerances, relative to a target cut height of the cutting edge 48 and relative to the radial side edge 48C, such that tear out can be at least be minimized. With respect to FIGS. 8 and 9, router bit 40B is positioned relative to the work piece 20' so a top surface 20A of the work piece 20' is at the target cut height, which is within the arc defined by the radial side edge 48C. The router bit 40A is positioned such that the top surface 20A is slightly below the target cut height, while router bit 40C is positioned such that the top surface 20A is above the target cut, but within a dimension defined by a height of the second side edge 48B.

The radial side edge 48C of the cutting edge 48 may be further described as a tangent arc relative to the first side edge 48A and second side edge 48B. In reference to FIG. 10, the cutting edge 48 or cutting element 46 has a target cut height 71 that is within the arc associated with the radial side edge 48C, or within a height dimension of the arc represented by dashed line 72. More specifically, the height dimension 72 of the radial side edge 48C is determined by points 53, 54 which are the tangent points at which lines defined by the first side edge 48A and second side edge 48B contact an arc defined by the radial side edge 48C.

By way of example, the router bit 40B, the cutting element 46, or cutting edge 48, may have a target cut height of ⅜" (0.375 inches or 9.525 mm), which, as shown, is within the arc defined by the radial side edge 48C or a height 72 of the radial side edge. The point 54 further represents an ending terminus of the radial side edge 48C and a starting terminus of the second side edge 48B, so the target cut height may also be characterized as being below a starting terminus of the second side edge 48B.

In the example of router bit 40B, the radial side edge 48C may have a radius of curvature from about 1.0 mm (0.040" inches) to about 2.5 mm (0.10" inches), and preferably about 1.5 mm (0.06" inches). The second side edge 48B may have a height dimension represented by dashed line 75 of about 0.51 mm (0.020" inches), wherein in the height is defined by point 54 and the ending terminus 56. To that end, the router bits 40A, 40B, 40C may have an upper cutting tolerance of 0.028" inches and represented by dotted line 78, and which is represented by the alignment of the bit 40C of FIGS. 8 and 9, whereby tear out is prevented.

Based on cutting trials or experimentation, the inventors have determined that a router bit 40, 40A-40C according to the above described dimensions may have a lower cutting tolerance of about 0.0150" below the target cut height 71 that is within and arc defined by the radial side edge 48C or within the height 72 of the radial side edge 48C.

With respect to FIGS. 16, 16A, 16B, and 16C, the inventive router bits 40A, 40B, 40C are shown in engaging work piece 20' to form grooves similar to that as shown in FIG. 9. The shaded areas X, Y, Z represent respective cross-section areas of the work piece 20' to be removed at the openings of the grooves, it least in part, by the radial side edge 48C of the cutting edge 48. Ideally, the target cut height 71 is always on the same plane as wood piece top surface 20"A; however, due to unintentional inaccurate router equipment set up and uneven wood board surfaces, the situations illustrated in FIGS. 16A and 16C may likely occur. In FIG. 16A, the radial side edge 48C engages the work piece 20' wherein the top surface 20A is positioned below the target cut height 71, and within a height of the radial side edge 48C defined by a vertical distance from terminus point 53 to terminus point 54. The shaded area X represents a cross-section are of the work piece 20A to be removed without creating tear out. To that end, FIG. 16B shows the radial side edge 48C of router bit 40B engaging the work piece 20' at the target cut height 71 to remove segments of the work piece 20' represented by shaded area Y without creating any tear out. As further shown in FIG. 16C and with respect to router bit 40C, the top surface 20A is positioned above the target cut height 71 and ending terminus 54 of the radial side arc 48C, but below an end terminus 56 of the second side edge 48B. In this example, the radial side edge 48C and second side edge 48B contribute to the removal of material represented by the shaded area Z, without generating tear out.

A second embodiment, according to aspects of the invention, is shown in FIGS. 11, 12, 13, 13A, and 14 and includes a bearingless groove router bit 50. As shown the router bit 50 may comprise a shank 52 and a head 54 at an end of the shank 52. The shank 52 is configured to fit within a router chuck of a router device (not shown) for cutting a work piece. More specifically, the shank 52 includes a first end 52A that fits into a chuck which is tightened against the shank 52 to support the router bit 50 within the router device. The head 54 is disposed at a second end 52B of the shank 52 spaced from the chuck and router device for cutting. In addition, the bit 50 includes a central longitudinal axis 55 which is common to the shank 52 and head 54.

One or more cutting elements 56 are affixed to the head 54. According to an aspect of the invention the router bit 50 comprises two diametrically opposed cutting elements 56, affixed to opposite sides of the head 54. Each cutting element 56 includes a first end 56A spaced from the second end 52B of the shank 52, and a second end 56B distal the first end 56A.

Each cutting element 56 includes a cutting edge 58 that extends between the first end 56A to the second 56B of the cutting element 56. According to aspects of the invention, the cutting edge 58 includes a straight first side edge 56A extending from the second end 56B of the cutting element 56 toward the first end 56A of the cutting element 56. In addition, a straight second side edge 58B is spaced from the first side edge 58B and projects or extends upwardly (or downwardly) and outwardly relative to the central axis 55. In an embodiment, the second side edge 58B is disposed at an angle of about 35° to about 55°, or about 145° to about 125°, relative to the central axis 55, and preferably about 40° to about 50°, or about 140° to about 130°, and most preferably about 46°, or 134°, relative to the central axis 55.

With respect to certain embodiments of the invention, the cutting edge 58 further comprises a first radial side edge 58C between and integral with the first side edge 58A and the second side edge 58B. As shown the radial side edge 58C projects radially inwardly relative to the central axis 55, and preferably has a radius of curvature of from about 1.0 mm (0.040 inches) to about 2.5 mm (0.100 inches), and preferably a radius of curvature of 1.5 mm (0.06 inches).

As further shown in this embodiment, the cutting edge 58 includes a second radial side edge 58D spaced apart from the first radial side edge 58C and is integral with the second side edge 58B. The second radial edge 58D projects radially outward relative to the central axis 55 and has a radius of curvature that may preferably be about twice as large as that of the first radial side edge 58C.

The cutting edge 58 and radial side edge 58C are configured such that a surface of a work piece may be aligned, within tolerances, relative to a target cut height of the cutting edge 58 and relative to the radial side edge 58C, such that tear out can be at least minimized. The radial side edge 58C of the cutting edge may be further described as a tangent arc relative to the first side edge 58A and second side edge 58B. In reference to FIG. 14, the cutting edge 58 or cutting element 56 has a target cut height 91 that is within the arc associated with the radial side edge 58C, or within a height dimension of the arc represented by dashed line 92. More specifically, the height dimension 92 is determined by points 93, 94 which are the tangent points at which lines defined by the first side edge 58A and second side edge 58B contact an arc defined by the radial side edge 58C.

By way of example, the router bit 50, the cutting element 56, or cutting edge 58, may have a target cut height of ⅜" (0.375 inches or 9.525 mm), which, as shown, is within the arc defined by the radial side edge 58C or a height 92 of the radial side edge 58C. The point 94 further represent an ending terminus of the radial side edge 58C and a starting terminus of the second side edge 58B, so the target cut height 91 may also be characterized as being below a starting terminus 94 of the second side edge 58B.

In the example of router bit 50, the radial side edge 58C may have a radius of curvature from about 1.0 mm (0.040") to about 2.5 mm (0.10"), and preferably about 1.5 mm (0.06"). The second side edge 58B may have a height dimension represented by dashed line 95 of about 0.51 mm (0.020"), wherein in the height is defined by point 94 and the ending terminus 96. To that end, the router bits 50 may have an upper cutting tolerance of 0.028", represented by dotted line 98.

Based on cutting trials or experimentation, the inventors have determined that a router bit 50 according to the above described dimensions may have a lower cutting tolerance of about 0.0150" below the target cut height 91 that is within the radial side edge 58C or within the height 92 of the radial side edge 58C.

The second radial edge 58D may have, for example a radius of curvature that is about twice as large as that of the first radial edge 58C. The second radial edge 58D prevents the formation of a step in a work surface in the event of misalignment of the bit head 54 relative to a work surface or a more dramatic non-uniform thickness of the work piece that would cause the second straight edge 58B to undercut the surface of the work piece.

While the above embodiments are described and illustrated with respect to a router bit 40, 50 having a dovetail-shaped profile, aspects of the invention bits having other profiles. For example, with respect to FIGS. 15 and 15A, there is shown a bearingless groove bit 60, in accordance with aspects of the invention, that has a straight edge profile for cutting straight grooves.

As shown, the router bit 60 may comprise a shank 62 and a head 64 at an end of the shank 62. The shank 62 is configured to fit within a router chuck or collet of a router device (not shown) for cutting a work piece. More specifically, the shank 62 includes a first end 62A that fits into a chuck which is tightened against the shank 62 to support the router bit 60 within the router device. The head 64 disposed at a second end 62B of the shank 62 spaced from the chuck and router device for cutting. In addition, the bit 60 includes a central longitudinal axis 65 which is common to the shank 62 and head 64.

One or more cutting elements 66 are affixed to the head 64. According to an aspect of the invention the router bit 60 comprises two diametrically opposed cutting elements 66, affixed to opposite sides of the head 64. Each cutting element 66 includes a first end 66A spaced from the second end 62B of the shank 62, and a second end 66B distal the first end 66A.

To that end, each cutting element 66 includes a cutting edge 68 that extends from between first end 66A to the second 66B of the cutting element 66. According to aspects of the invention, the cutting edge 68 includes a straight first side edge 68A extending from the second end 66B of the cutting element 66 toward the first end 66A of the cutting element 66. In addition, a straight second side edge 68B is spaced from the first side edge 68A and projects or extends upwardly (or downwardly) and outwardly relative to the central axis 65. In an embodiment, the second side edge 68B is disposed at an angle of about 35° to about 55°, or about 145° to about 125°, relative to the central axis 65, and preferably about 40° to about 50°, or about 140° to 130°, and most preferably about 46°, or 134°, relative to the central axis 65.

With respect to certain embodiments of the invention, the cutting edge 68 further comprises a radial side edge 68C between and integral with the first side edge 68A and the second side edge 68B. As shown the radial side edge 68C projects radially inwardly relative to the central axis 65, and preferably has a radius of curvature of from about 1.0 mm (0.040 inches) to about 2.5 mm (0.100 inches), and preferably a radius of curvature of 1.5 mm (0.06 inches).

Figure 17A:
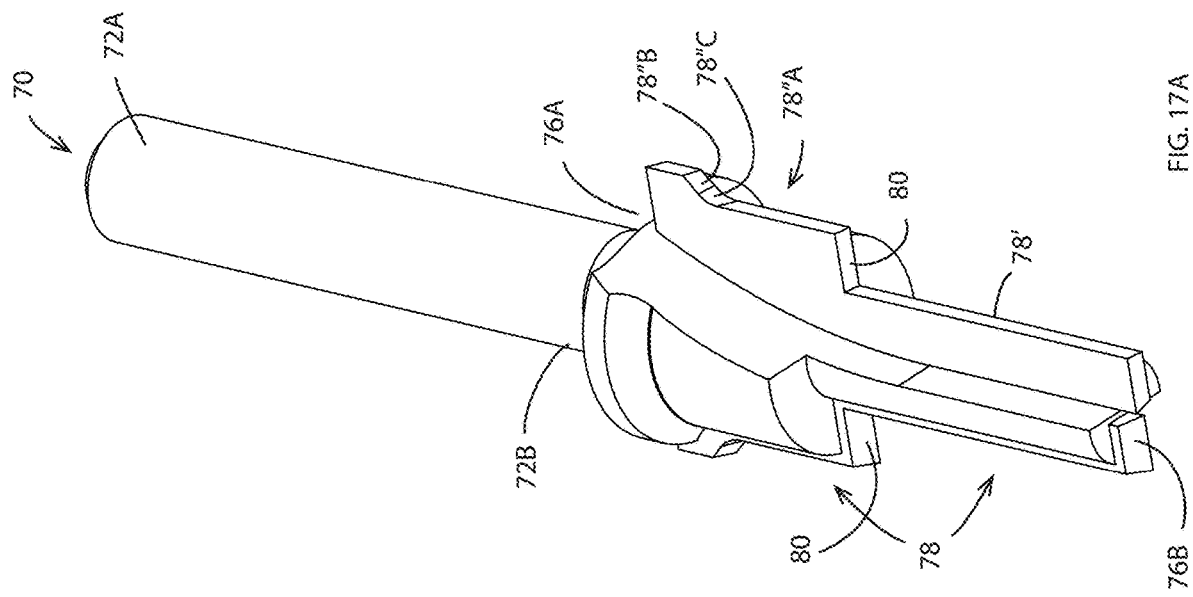
FIG. 17A is a perspective view of the router bit of FIG. 17.
Figure 17:
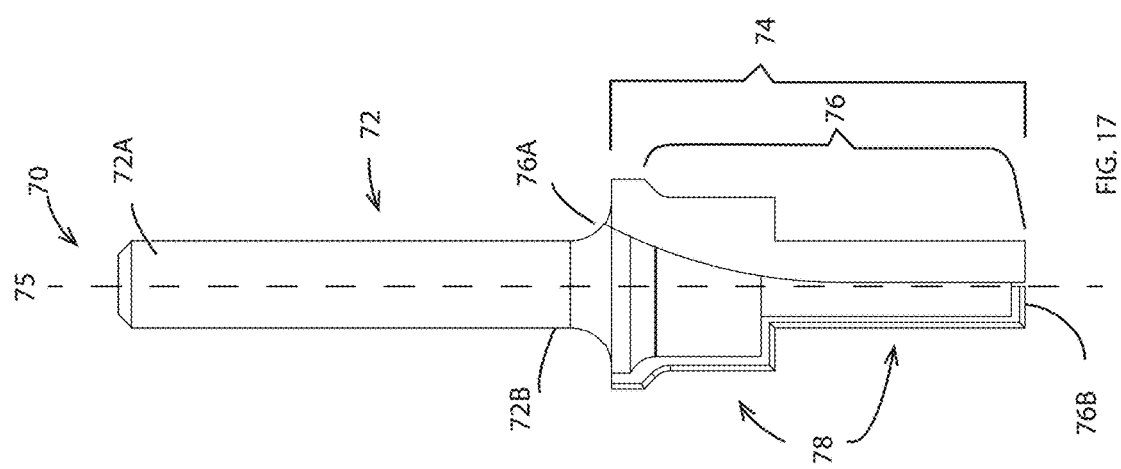
FIG. 17 is a front or back elevational and partial sectional view of a router bit according to aspects of the invention.

With respect to FIGS. 17 and 17A there is shown a stepped router bit 70 according to aspects of the invention. The stepped router bit 70 forms a stepped profile for forming a groove. As may be appreciated, the invention is not limited to a particular bit, groove or edge profile, but may encompass other types of bits such as chamfer bits, ball bits, keyhole or T-slot bits, screw slot bits, counter sink bits and double rounding edge bits.

Again, the bit shown in FIGS. 17 and 17A is a stepped router bit that forms a stepped profile in a workpiece according to its cutting-edge profile. As shown, the router bit 70 may comprise a shank 72 and a head 74 and an end of the shank 72. The shank 72 is configured to fit within a router chuck or collet of a router device (not shown) for cutting a work piece. More specifically, the shank 72 includes a first end 72A that first end 72A that fits into a chuck, which is tightened against the shank 72 to support the router bit 70 within the router device. The head 74 is disposed at the second end 72B of the shank 72 spaced from the chuck and router device for cutting. In addition, the bit 70 includes a central longitudinal axis 75 which is common to the shank 72 and head 74.

One or more cutting elements 76 are affixed to the head 74. According to an aspect of the invention the router bit 70 comprises two diametrically opposed cutting elements 76, affixed to opposite sides of the head 74. Each cutting element 76 includes a first end 76A spaced from the second end 72B of the shank 72, and a second end 76B distal the first end 76A.

To that end, each cutting element 76 includes a cutting edge 78 that extend from between first end 76A to the second 76B of the cutting element 76. In this particular embodiment, each cutting edge 78 includes a first section 78' and second section 78", wherein the second sections 78" of the diametrically opposed sections and edges form a diameter that is greater than a diameter of the diametrically opposed first sections 78' thereby forming the step or shoulder 80. According to aspects of the invention, the cutting edge 78" includes a first side edge 78"A extending toward the first end 76A of the cutting element 76. In addition, a second side edge 78"B is spaced from the first side edge 78"A and projects or extends upwardly (or downwardly) and outwardly relative to the central axis 75. In an embodiment, the second side edge 78"B is disposed at an angle of about 35° to about 55°, or about 145° to about 125°, relative to the central axis 75, and preferably about 40° to about 50°, or about 140° to 130°, and most preferably about 46°, or 134°, relative to the central axis 65.

With respect to certain embodiments of the invention, the cutting edge 78 further comprises a radial side edge 78"C between with the first side edges 78' and 78"A and the second side edge 78"B. As shown the radial side edge 78"C projects radially inwardly relative to the central axis 75, and preferably has a radius of curvature of from about 1.0 mm (0.040 inches) to about 2.5 mm (0.100 inches), and preferably a radius of curvature of 1.5 mm (0.06 inches).

While the preferred embodiments of the present invention have been shown and described herein, it will be obvious that such embodiments are provided by way of example only. Numerous variations, changes and substitutions will occur to those of skill in the art without departing from the invention herein. Non-limiting examples include a component that is described above as being attached to one part of the apparatus may alternatively be attached to a different part of the apparatus in other embodiments. Parts described as being indirectly connected may be connected directly to each other, and vice versa. Component parts may be assembled from individual pieces or may be integrally formed as a single unit. Alternative types of connectors and alternative materials may be used. The apparatus may be used with other types of power tools. Accordingly, it is intended that the invention be limited only by the spirit and scope of the appended claims.

The invention claimed is:

1. A bearingless router bit for cutting a groove in an interior of a workpiece beginning from a side edge of the workpiece, comprising:
   a shank connectable to a router chuck;
   a head comprising a first end connected to an end of the shank and second free end distal and opposite the first end;
   wherein the router bit comprises a central axis or the shank and the head have a common central longitudinal axis about which the router bit rotates for cutting;
   a cutting element affixed to the head and comprising a first end spaced from the end of the shank connected to the head and a second end adjacent to the second end of the head;
   a cutting edge comprising a cutting edge profile extending along the cutting element from the first end to the second end of the cutting element, and the cutting edge, comprising:
   a first side edge extending from the second end of the cutting element toward the first end of the cutting element;
   a second straight side edge extending radially upward and outward relative to the first side edge of the cutting element and the central axis; and,
   a radial side edge between the first side edge and the second straight side edge and the radial side edge comprises a radius of curvature from 1.0 mm to 2.5 mm, wherein the radial side edge defines a tangent arc relative to the first side edge and the second straight side edge, and the radial side edge defines an inwardly projecting arc relative to the central axis;
   wherein the first side edge comprises at least one section that is straight and directly connected to the radial side edge;
   wherein the at least one section comprises a first section and a second section, wherein the first section is straight, wherein the second section is straight and directly connected to the radial said edge, and wherein the first section is disposed laterally inward toward the central axis relative to the second section and thereby forms a step between the first section and the second section, and
   wherein the second section is parallel to the central axis.

2. The router bit of claim 1, wherein along the central axis a center of the radius of curvature is disposed closer to the second end of the cutting element than a longitudinal center of the radial side edge.

3. The router bit of claim 1, wherein the second straight side edge is disposed at an angle from 35° to 55°, or from 145° to 125°, relative to the central axis.

4. The router bit of claim 1, wherein the radial side edge is a first radial side edge and the cutting edge further comprises a second radial side edge spaced above the first radial side edge and integral with the second straight side edge opposite the first radial side edge, and the second radial side edge defines an outwardly projecting arc relative to the central axis.

5. The router bit of claim 4, the second radial side edge comprises a radius of curvature that is about twice as large as that of the first radial side edge.

6. The router bit of claim 1, wherein the second straight side edge and the radial side edge share a terminus point and the router bit comprises a target cutting height below the terminus point toward the second end of the cutting element.

7. The router bit of claim 6, wherein the terminus point is a first terminus point and the second straight side edge comprises a second terminus point spaced from the first terminus point toward the first end of the cutting element and a vertical distance from the target cutting height to the second terminus point defines an upper cutting tolerance within which tear out is minimized during cutting.

8. A bearingless router bit for cutting a groove in an interior of a workpiece beginning from a side edge of the workpiece, comprising:
   a shank connectable to a router chuck;
   a head comprising a first end connected to an end of the shank and second free end distal and opposite the first end;
   wherein the router bit comprises a central axis or the shank and the head have a common central longitudinal axis about which the router bit rotates for cutting;
   two diametrically opposed cutting elements affixed to the head and each cutting element comprising a first end spaced from the end of the shank connected to the head and a second end adjacent to the second end of the head;
      each cutting element comprising a cutting edge comprising a cutting edge profile extending along a respective side of the cutting element from the first end to the second end of the cutting element, and each cutting edge, comprising:
         a first side edge extending from the second end of the cutting element toward the first end of the cutting element;
         a second straight side edge extending radially upward and outward relative to the first side edge of the cutting edge and the central axis; and,
         a radial side edge directly connected to the first side edge and the second straight side edge and the radial side edge comprises a radius of curvature from about 1.0 mm to about 2.5 mm, wherein the radial side edge defines a tangent arc relative to the first side edge and the second straight side edge, and wherein along the central axis a center of the radius of curvature is disposed closer to the second end of the cutting element than a longitudinal center of the radial side edge;
      wherein the first side edge comprises at least one section that is straight and directly connected to the radial side edge.

9. The router bit of claim 8, wherein the second straight side edge is disposed at an angle from 35° to 55°, or from 145° to 125°, relative to the central axis.

10. The router bit of claim 8, wherein the second straight side edge and the radial side edge share a terminus point and the router bit comprises a target cutting height below the terminus point toward the second end of the cutting element.

11. The router bit of claim 10, wherein the terminus point is a first terminus point and the second straight side edge comprises a second terminus point spaced from the first terminus point toward the first end of the cutting element and a vertical distance from the target cutting height to the second terminus point defines an upper cutting tolerance within which tear out is minimized during cutting.

12. The router bit of claim 8, wherein the at least one section comprises a first section and a second section, wherein the first section is straight and parallel to the central axis, wherein the second is straight, parallel to the central axis, and directly connected to the radial side edge, and wherein the first section is disposed laterally inward toward the central axis relative to the second section and thereby forms a step between the first section and the second section.

13. The router bit of claim 1, wherein the radial side edge is directly connected to the first side edge and to the second straight side edge.

14. The router bit of claim 1, wherein the first section is parallel to the central axis.

* * * * *